US006627334B2

(12) United States Patent
Iida et al.

(10) Patent No.: US 6,627,334 B2
(45) Date of Patent: Sep. 30, 2003

(54) MAGNETIC TAPE AND METHOD AND APPARATUS FOR SLITTING MAGNETIC TAPE WEBS

(75) Inventors: Sampei Iida, Kanagawa-ken (JP); Shingo Fujikata, Kanagawa-ken (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 214 days.

(21) Appl. No.: 09/767,841

(22) Filed: Jan. 24, 2001

(65) Prior Publication Data

US 2001/0009726 A1 Jul. 26, 2001

(30) Foreign Application Priority Data

Jan. 24, 2000 (JP) .......................... 2000-013839
Mar. 27, 2000 (JP) .......................... 2000-086718

(51) Int. Cl.[7] .................................................. G11B 5/66
(52) U.S. Cl. ............................. 428/694 R; 428/694 T; 428/694 TB; 428/900; 427/128; 427/129; 427/130; 427/131; 83/62.1; 83/436; 83/437; 83/503; 83/508.3; 83/698.51

(58) Field of Search ...................... 428/634 TB, 394 R, 428/634 T, 900; 427/128–131; 83/62.1, 437, 436, 503, 508.3, 698.51

(56) References Cited

U.S. PATENT DOCUMENTS

| | | | | |
|---|---|---|---|---|
| 5,423,239 A | * | 6/1995 | Sakai et al. | ..................... 83/56 |
| 5,827,599 A | * | 10/1998 | Murao | ......................... 428/141 |
| 5,873,293 A | * | 2/1999 | Yamazaki | .................... 83/497 |
| 6,394,330 B1 | * | 5/2002 | Jackson | ......................... 225/2 |

* cited by examiner

Primary Examiner—Leszek Kiliman
(74) Attorney, Agent, or Firm—Sughrue Mion, PLLC

(57) ABSTRACT

A plurality of upper slitting blades and a plurality of lower slitting blades are located such that each of the upper slitting blades stands facing one of the lower slitting blades. The upper slitting blade and the lower slitting blade, which stand facing each other, are located such that a cutting edge vicinity region of the upper slitting blade and a cutting edge vicinity region of the lower slitting blade overlap each other in a radial direction. The plurality of the upper slitting blades and the plurality of the lower slitting blades are rotated to slit a magnetic tape web into magnetic tapes. A cutting edge of each of the upper slitting blades and/or a cutting edge of each of the lower slitting blades has a curved shape.

10 Claims, 7 Drawing Sheets

MAGNETIC TAPE AND METHOD AND APPARATUS FOR SLITTING MAGNETIC TAPE WEBS

BACKGROUND OF THE INVENTION

1. Field of the Invention

This invention relates to a magnetic tape for recording various kinds of information. This invention also relates to a method and apparatus for slitting a magnetic tape web into magnetic tapes. This invention further relates to a method of polishing magnetic tape web slitting blades, which are utilized for slitting a magnetic tape web having a wide width into long narrow magnetic tapes.

2. Description of the Related Art

Magnetic tapes have heretofore been utilized for recording various kinds of information, such as video information and audio information. Ordinarily, the magnetic tape comprises a base layer, a back coating layer overlaid on one surface side of the base layer, and a magnetic layer overlaid on the other surface side of the base layer. The magnetic tape is moved in the longitudinal direction of the magnetic tape, while the magnetic layer of the magnetic tape is being in contact with a head of a recording and readout apparatus, and information is thereby recorded on the magnetic tape or read out from the magnetic tape.

Ordinarily, magnetic tapes are formed by slitting a magnetic tape web. For the slitting of the magnetic tape web, for example, a slitting apparatus as illustrated in FIG. 1, which will be described later, is utilized. As illustrated in FIG. 1, the slitting apparatus comprises an upper slitting blade shaft 1 and a lower slitting blade shaft 2. A plurality of upper slitting blades 3, 3, . . . are fitted to the upper slitting blade shaft 1 so as to stand side by side along an axial direction, and such that cutting edges of the upper slitting blades 3, 3, . . . may be located at predetermined intervals. Also, a plurality of lower slitting blades 4, 4, . . . are fitted to the lower slitting blade shaft 2 so as to stand side by side along the axial direction, and such that cutting edges of the lower slitting blades 4, 4, . . . maybe located at the predetermined intervals. The upper slitting blade 3 and the lower slitting blade 4, which stand facing each other, are located such that a cutting edge vicinity region of the upper slitting blade 3 and a cutting edge vicinity region of the lower slitting blade 4 may overlap each other in a radial direction. In the slitting apparatus, a magnetic tape web 5 having a wide width is set such that the magnetic layer may face up. Also, the magnetic tape web 5 is moved between the upper slitting blades 3, 3, . . . and the lower slitting blades 4, 4, . . . and along a direction normal to the plane of the sheet of FIG. 1, while the upper slitting blades 3, 3, . . . and the lower slitting blades 4, 4, . . . are being rotated respectively together with the upper slitting blade shaft 1 and the lower slitting blade shaft 2. In this manner, the magnetic tape web 5 is slitted into a plurality of long narrow magnetic tapes 6, 6, . . .

As illustrated in FIG. 14, in conventional slitting apparatuses for forming magnetic tapes, ordinarily, each of a cutting edge 3a' of an upper slitting blade 3' and a cutting edge 4a' of a lower slitting blade 4' is formed in an approximately right-angled, sharp angular shape. With the conventional slitting apparatuses, conventional magnetic tapes having a shape as illustrated in FIG. 15 are ordinarily obtained from the slitting operation with upper slitting blades 3', 3', . . . and lower slitting blades 4', 4', . . . , which are respectively provided with the cutting edges 3a', 3a', . . . and the cutting edges 4a', 4a', . . . having the angular shape.

Specifically, as illustrated in FIG. 15, each magnetic tape 6' has side faces 7 and 8 (cut surfaces having been cut by two adjacent upper slitting blades 3', 3' and corresponding lower slitting blades 4', 4'), which are formed at opposite ends with respect to the width direction of the magnetic tape 6'. At the side face 8 on the upper slitting blade side, the side face of a back coating layer 11 is located more inward than the side face of a base layer 10 by a distance of δu in the width direction of the magnetic tape 6'. Also, at the side face 7 on the lower slitting blade side, the side face of the back coating layer 11 is located more outward than the side face of the base layer 10 by a distance of δd in the width direction of the magnetic tape 6'. In FIG. 15, reference numeral 12 represents the magnetic layer.

In FIG. 1, a side face 3b of the upper slitting blade 3 on the side, which stands facing the cutting edge 4a of the lower slitting blade 4, is referred to as the ventral side, and an opposite side face 3c of the upper slitting blade 3 is referred to as the back. Also, the side face of each magnetic tape 6, which side face stands facing the ventral side 3b of the upper slitting blade 3, is referred to as the side face on the lower slitting blade side, and the side face of each magnetic tape 6, which side face stands facing the back 3c of the upper slitting blade 3, is referred to as the side face on the upper slitting blade side. In FIG. 1, the left side face of each magnetic tape 6 is the side face on the lower slitting blade side, and the right side face of the magnetic tape 6 is the side face on the upper slitting blade side.

Nowadays, as in the cases of other kinds of recording media, there is a strong demand for magnetic tapes on which information can be recorded at high densities and which have a high capacity. The inventors conducted extensive research for satisfying the demand and found that, in cases where the side face of the back coating layer 11 is projected to a position more outward than the side face of the base layer 10 in the width direction of the magnetic tape 6', the problems described below occur.

Specifically, as the capability of the recording at high densities is required of the magnetic tapes, recording tracks are formed at high densities on the magnetic tapes. In order for the recording tracks to be traced accurately, it is necessary that regulation of the position of the magnetic tape with respect to the width direction of the magnetic tape be tightened during the running operation of the magnetic tape in the recording and read-out apparatus. In cases where regulation of the position of the magnetic tape with respect to the width direction of the magnetic tape is tightened, a contact pressure between the side face of the magnetic tape and a guide for regulating the position of the side face of the magnetic tape becomes high. As a result, the problems occur in that the side face of the back coating layer 11, which side face is projected outwardly in the width direction of the magnetic tape, is scraped off due to the contact with the guide at the high contact pressure, and the resulting scrapings cause drop-outs, and the like, to occur.

Also, in cases where the side face of the magnetic layer 12 is projected more outward than the side face of the base layer 10 in the width direction of the magnetic tape 6', scrapings of the magnetic layer 12 will occur. However, the regulation of the position of the magnetic tape 6' with respect to the width direction of the magnetic tape 6' is performed particularly on the side of the back coating layer 11 of the magnetic tape 6'. Therefore, the guide described above primarily comes into contact with the side faces of the base layer 10 and the back coating layer 11. Accordingly, particularly, the side face of the back coating layer 11, which side face projects outwardly in the width direction of the magnetic tape 6', markedly causes the problems, such as the occurrence of the scrapings and the drop-outs due to the scrapings, to occur.

Also, recently, as a high capacity is required of the magnetic tapes, there is a strong demand for magnetic tapes having a small thickness. In order to satisfy the demand, the thickness of the base layer 10 is set to be thin, and a material having a high strength, such as PEN or an aramid, is employed as the material for the base layer 10 in order to avoid a decrease in strength of the magnetic tape 6'. However, it was found that, in cases where the base layer 10 is formed from a material having a high strength, the back coating layer 11 is apt to project outwardly in the width direction of the magnetic tape 6' during the slitting operation with the upper slitting blades 3', 3', . . . and the lower slitting blades 4', 4', . . . , and the problems described above, such as the occurrence of the scrapings and the drop-outs due to the scrapings, occur more markedly.

SUMMARY OF THE INVENTION

The primary object of the present invention is to provide a magnetic tape, wherein problems due to scrapings of a back coating layer of the magnetic tape are capable of being prevented from occurring in cases where regulation of a position of the magnetic tape with respect to a width direction of the magnetic tape is tightened during a running operation of the magnetic tape.

Another object of the present invention is to provide a method of slitting a magnetic tape web, wherein a magnetic tape is capable of being formed such that problems due to scrapings of a back coating layer of the magnetic tape are capable of being prevented from occurring in cases where regulation of a position of the magnetic tape with respect to a width direction of the magnetic tape is tightened during a running operation of the magnetic tape.

A further object of the present invention is to provide an apparatus for carrying out the method of slitting a magnetic tape web.

A still further object of the present invention is to provide a method of polishing magnetic tape web slitting blades, wherein cutting edges of upper slitting blades or lower slitting blades for slitting a magnetic tape web are capable of being polished easily and efficiently into a curved shape.

Another object of the present invention is to provide a method of polishing magnetic tape web slitting blades, wherein cutting edges of lower slitting blades, which are fitted to a lower slitting blade shaft, are capable of being polished easily and uniformly into a curved shape.

A further object of the present invention is to provide a method of polishing magnetic tape web slitting blades, wherein cutting edges of upper slitting blades, which are located side by side such that the upper slitting blades are in close contact with one another, are capable of being polished easily and uniformly into a curved shape.

The present invention provides a magnetic tape, comprising:
i) a base layer,
ii) a back coating layer overlaid on one surface side of the base layer, and
iii) a magnetic layer overlaid on the other surface side of the base layer,
wherein, at each of two side faces of the magnetic tape, which side faces are located at opposite ends of the magnetic tape with respect to a width direction of the magnetic tape, a side face of the back coating layer is in the same plane as a side face of the base layer or is located more inward than the side face of the base layer in the width direction of the magnetic tape.

The present invention also provides a method of slitting a magnetic tape web, comprising the steps of:
i) locating a plurality of upper slitting blades and a plurality of lower slitting blades such that each of the upper slitting blades stands facing one of the lower slitting blades, the upper slitting blade and the lower slitting blade, which stand facing each other, being located such that a cutting edge vicinity region of the upper slitting blade and a cutting edge vicinity region of the lower slitting blade overlap each other in a radial direction, and
ii) rotating the plurality of the upper slitting blades and the plurality of the lower slitting blades to slit a magnetic tape web into magnetic tapes,
wherein a cutting edge of each of the upper slitting blades and/or a cutting edge of each of the lower slitting blades has a curved shape.

The present invention further provides an apparatus for slitting a magnetic tape web, comprising:
i) a plurality of upper slitting blades and a plurality of lower slitting blades, which are located such that each of the upper slitting blades stands facing one of the lower slitting blades, the upper slitting blade and the lower slitting blade, which stand facing each other, being located such that a cutting edge vicinity region of the upper slitting blade and a cutting edge vicinity region of the lower slitting blade overlap each other in a radial direction, and
ii) means for rotating the plurality of the upper slitting blades and the plurality of the lower slitting blades to slit a magnetic tape web into magnetic tapes,
wherein a cutting edge of each of the upper slitting blades and/or a cutting edge of each of the lower slitting blades has a curved shape.

In the apparatus for slitting a magnetic tape web in accordance with the present invention, the cutting edge of each of the lower slitting blades may have the curved shape, and a width of the curved shape of the cutting edge of each of the lower slitting blades, which width is taken in the radial direction, may fall within the range of 0.2 $\mu$m to 3 $\mu$m.

Also, in the apparatus for slitting a magnetic tape web in accordance with the present invention, the cutting edge of each of the upper slitting blades may have the curved shape, and a width of the curved shape of the cutting edge of each of the upper slitting blades, which width is taken in the radial direction, may fall within the range of 0.3 $\mu$m to 3 $\mu$m.

The present invention still further provides a method of polishing magnetic tape web slitting blades, in which cutting edges of circular upper slitting blades or cutting edges of circular lower slitting blades are polished, the circular upper slitting blades and the circular lower slitting blades being for use in an apparatus for slitting a magnetic tape web, wherein a magnetic tape web is slit into magnetic tapes with a plurality of the circular upper slitting blades, which are fitted to an upper slitting blade shaft so as to stand side by side in an axial direction, and a plurality of the circular lower slitting blades, which are fitted to a lower slitting blade shaft so as to stand side by side in the axial direction, the method comprising the steps of:
i) rotating the upper slitting blades or the lower slitting blades, and
ii) pushing a whetstone, which has a hardness equal to at most a hardness equivalent to a Rockwell hardness of 60, as measured on a scale L, against outer circumferential surfaces of the upper slitting blades or outer circumferential surfaces of the lower slitting blades to polish the cutting edge of each of the upper slitting blades or the cutting edge of each of the lower slitting blades into a curved shape.

The method of polishing magnetic tape web slitting blades in accordance with the present invention may be modified such that each of the lower slitting blades has a large diameter section and a small diameter section, the cutting edge of each of the lower slitting blades is formed at an end of the outer circumferential surface of the large diameter section, the lower slitting blades are kept in a state, in which the lower slitting blades are fitted to the lower slitting blade shaft, the lower slitting blades are rotated together with the lower slitting blade shaft, and the whetstone is pushed against the outer circumferential surfaces of the lower slitting blades, while the lower slitting blades are being rotated, to polish the cutting edge of each of the lower slitting blades into the curved shape.

Also, the method of polishing magnetic tape web slitting blades in accordance with the present invention may be modified such that the cutting edge of each of the upper slitting blades is formed at one of ends of the outer circumferential surface of each of the upper slitting blades, a back oblique surface is formed at the other end side of the outer circumferential surface of each of the upper slitting blades, the upper slitting blades are set in a state, in which the upper slitting blades are fitted to a shaft for a polishing operation, such that the upper slitting blades stand side by side and are in close contact with one another, the upper slitting blades are rotated together with the shaft for the polishing operation, and the whetstone is pushed against the outer circumferential surfaces of the upper slitting blades, while the upper slitting blades are being rotated, to polish the cutting edge of each of the upper slitting blades into the curved shape.

The small diameter section of each of the lower slitting blades may have one of various shapes, such that a concavity, into which the whetstone is capable of projecting as will be described later, is substantially formed by the small diameter section. Also, the back oblique surface of each of the upper slitting blades may have one of various shapes, such that a concavity, into which the whetstone is capable of projecting as will be described later, is substantially formed by the back oblique surface. The cutting edge of each of the lower slitting blades may be formed at either one of the end of the outer circumferential surface of the large diameter section, which end is on the side opposite to the end on the side of the small diameter section, and the end of the outer circumferential surface of the large diameter section, which end is on the side of the small diameter section.

With the magnetic tape in accordance with the present invention, at each of the two side faces of the magnetic tape, the side face of the back coating layer is in the same plane as the side face of the base layer or is located more inward than the side face of the base layer in the width direction of the magnetic tape. Therefore, it is possible to sufficiently restrict the occurrence of the problems in that the side face of the back coating layer is scraped by a guide during movement of the magnetic tape in a recording and read-out apparatus and scrapings of the back coating layer occur. Accordingly, in cases where regulation of the position of the magnetic tape with respect to the width direction of the magnetic tape during the movement of the magnetic tape is tightened in accordance with high recording densities, the problems, such as drop-outs, due to the scrapings of the back coating layer are capable of being prevented from occurring.

With the method and apparatus for slitting a magnetic tape web in accordance with the present invention, the cutting edge of each of the upper slitting blades and/or the cutting edge of each of the lower slitting blades has a curved shape, and the magnetic tape web is slit with the upper slitting blades and the lower slitting blades. Therefore, at the slit side face of the magnetic tape, the length, by which the side face of the back coating layer is projected outwardly in the width direction of the magnetic tape from the side face of the base layer, is capable of being kept smaller than in a magnetic tape having been slit with the conventional upper slitting blades and the conventional lower slitting blades, each of which has a cutting edge having a sharp angular shape. Accordingly, the occurrence of scrapings of the back coating layer due to the regulation of the position of the magnetic tape with respect to the width direction of the magnetic tape during the movement of the magnetic tape is capable of being restricted. As a result, magnetic tapes having good quality, which are suitable for the recording at high densities and the enhancement of the capacity, are capable of being formed.

In cases where the cutting edge of each of the lower slitting blades has the curved shape, and the width of the curved shape of the cutting edge of each of the lower slitting blades, which width is taken in the radial direction, may fall within the range of 0.2 $\mu$m to 3 $\mu$m. Also, in cases where the cutting edge of each of the upper slitting blades has the curved shape, the width of the curved shape of the cutting edge of each of the upper slitting blades, which width is taken in the radial direction, may fall within the range of 0.3 $\mu$m to 3 $\mu$m. In such cases, the length, by which the side face of the back coating layer is projected outwardly in the width direction of the magnetic tape from the side face of the base layer, is capable of being minimized, such that no problem occurs in practice due to the occurrence of the scrapings, while the slitting performance (i.e., the cutting performance) required of the slitting blades is being ensured.

Specifically, the occurrence of the scrapings of the back coating layer is capable of being minimized, such that no problem occurs in practice.

With the method of polishing magnetic tape web slitting blades in accordance with the present invention, the upper slitting blades or the lower slitting blades are rotated, and the soft whetstone, which has a hardness equal to at most a hardness equivalent to a Rockwell hardness of 60, as measured on the scale L, is pushed against the outer circumferential surfaces of the upper slitting blades or the outer circumferential surfaces of the lower slitting blades to polish the cutting edge of each of the upper slitting blades or the cutting edge of each of the lower slitting blades into the curved shape. (The soft whetstone having the hardness described above is herein referred to as the resilient whetstone.) When the whetstone is pushed against the outer circumferential surfaces of the upper slitting blades or the outer circumferential surfaces of the lower slitting blades, the regions of the whetstone, which are in contact with the outer circumferential surfaces of the slitting blades, become depressed. Therefore, the whetstone comes into contact with the cutting edges so as to cover the cutting edges. As a result, each of the cutting edges is capable of being polished into the curved shape. In order for the cutting edges to be polished into the curved shape, it is sufficient for the whetstone to be pushed against the outer circumferential surfaces of the upper slitting blades or the outer circumferential surfaces of the lower slitting blades. Accordingly, the cutting edges are capable of being polished easily and efficiently into the curved shape.

With method of polishing magnetic tape web slitting blades in accordance with the present invention, in cases where each of the lower slitting blades has the large diameter section and the small diameter section, and the cutting edge of each of the lower slitting blades is formed at the end of the outer circumferential surface of the large diameter section, the lower slitting blades may be kept in the state, in which the lower slitting blades are fitted to the lower slitting blade shaft, the lower slitting blades may be rotated together with the lower slitting blade shaft, and the whetstone may be pushed against the outer circumferential surfaces of the lower slitting blades, while the lower slitting blades are being rotated, to polish the cutting edge of each of the lower slitting blades into the curved shape. In such cases, the regions of the resilient whetstone, which are in contact with the outer circumferential surfaces of the lower slitting blades, become depressed, and the regions of the resilient whetstone, which stand facing the concavities formed by the small diameter sections of the lower slitting blades, become protruded into the concavities. The protruded regions of the whetstone come into contact with the cutting edges of the lower slitting blades so as to cover the cutting edges. As a result, the cutting edges are polished into the curved shape. Therefore, the polishing of the cutting edges into the curved shape is capable of being performed while the lower slitting blades are being fitted to the lower slitting blade shaft. Also, since the whetstone is soft, even if the cutting edges of the lower slitting blades wobble in the radial direction or the axial direction during the rotation of the lower slitting blades, the outer circumferential surface of the whetstone is depressed so as to follow up the wobbling of the cutting edges. Therefore, regardless of the wobbling of the cutting edges, a fine curved shape is capable of being formed uniformly at respective positions in the circumferential direction. Further, since the cutting edges are polished while the lower slitting blades are being kept in the state, in which the lower slitting blades are fitted to the lower slitting blade shaft, it is not necessary to perform a particular operation for again fitting the lower slitting blades to the lower slitting blade shaft after the polishing operation is completed.

Also, with the method of polishing magnetic tape web slitting blades in accordance with the present invention, in cases where the cutting edge of each of the upper slitting blades is formed at one of ends of the outer circumferential surface of each of the upper slitting blades, and the back oblique surface is formed at the other end side of the outer circumferential surface of each of the upper slitting blades, the upper slitting blades may be set in the state, in which the upper slitting blades are fitted to the shaft for the polishing operation, such that the upper slitting blades stand side by side and are in close contact with one another, and the upper slitting blades may be rotated together with the shaft for the polishing operation. Also, the whetstone may be pushed against the outer circumferential surfaces of the upper slitting blades, while the upper slitting blades are being rotated, to polish the cutting edge of each of the upper slitting blades into the curved shape. In such cases, the regions of the resilient whetstone, which are in contact with the outer circumferential surfaces of the upper slitting blades, become depressed, and the regions of the resilient whetstone, which stand facing the concavities formed by the back oblique surfaces of the upper slitting blades, become protruded into the concavities. The protruded regions of the whetstone come into contact with the cutting edges of the upper slitting blades so as to cover the cutting edges. As a result, the cutting edges are polished into the curved shape. Therefore, the polishing of the cutting edges into the curved shape is capable of being performed in the state, in which the upper slitting blades are fitted to the shaft for the polishing operation, such that the upper slitting blades stand side by side and are in close contact with one another. Also, since the whetstone is soft, even if the cutting edges of the upper slitting blades wobble in the radial direction or the axial direction during the rotation of the upper slitting blades, the outer circumferential surface of the whetstone is depressed so as to follow up the wobbling of the cutting edges. Therefore, regardless of the wobbling of the cutting edges, a fine curved shape is capable of being formed uniformly at respective positions in the circumferential direction. Further, since the polishing operation is performed in the state, in which the upper slitting blades are fitted together to the shaft for the polishing operation, the polishing operation is capable of being performed efficiently.

DESCRIPTION OF THE PREFERRED EMBODIMENTS

The present invention will hereinbelow be described in further detail with reference to the accompanying drawings.

Figure 1:
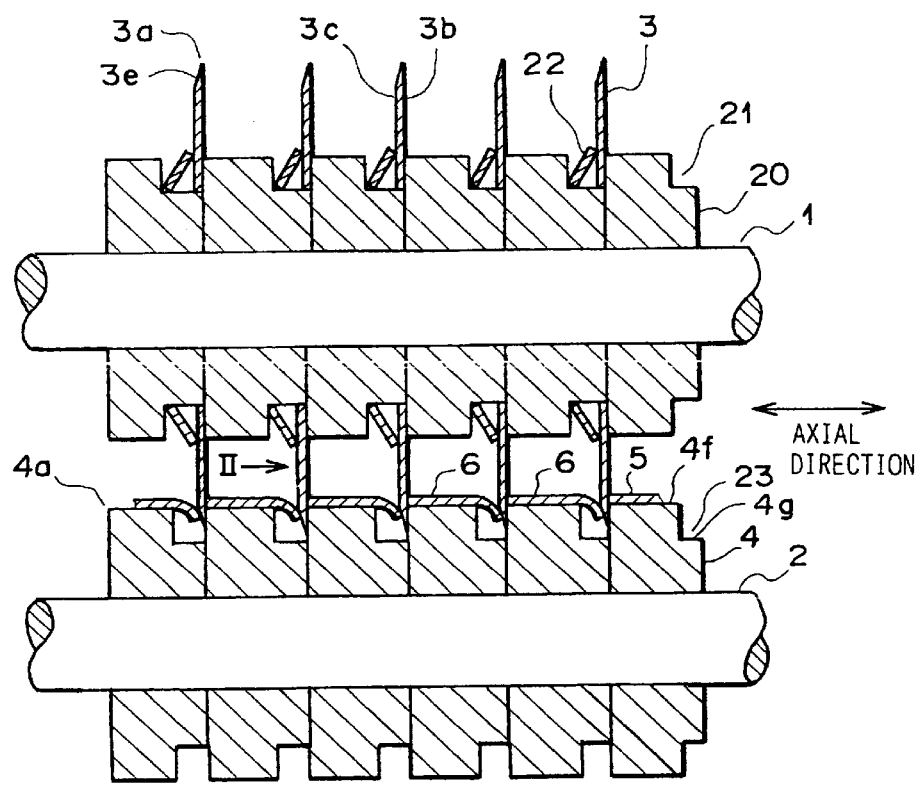
FIG. 1 is a sectional view showing an embodiment of the apparatus for slitting a magnetic tape web in accordance with the present invention.

FIG. 1 is a sectional view showing an embodiment of the apparatus for slitting a magnetic tape web in accordance with the present invention. The slitting apparatus shown in FIG. 1 basically has the same constitution as the constitution of a conventional apparatus for slitting a magnetic tape web, except for cutting edges of upper slitting blades and lower slitting blades.

Figure 2:
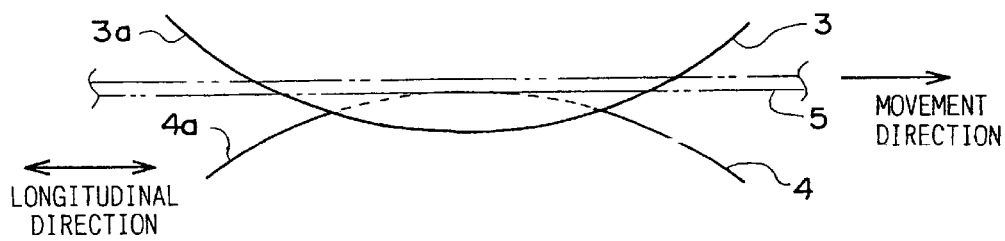
FIG. 2 is an explanatory view taken from the direction indicated by the arrow II of FIG. 1.

As in the conventional slitting apparatus, the slitting apparatus shown in FIG. 1 comprises an upper slitting blade shaft 1 and a lower slitting blade shaft 2, which are located in parallel with each other. A plurality of upper slitting blades 3, 3, . . . , each of which has a circular outer circumference, are fitted to the upper slitting blade shaft 1 via holders 20, 20, . . . , each of which has a circular outer circumference. Also, a plurality of lower slitting blades 4, 4, . . . , each of which has a circular outer circumference, are fitted directly to the lower slitting blade shaft 2. The upper slitting blades 3, 3, . . . are fitted to the upper slitting blade shaft 1, such that cutting edges 3a, 3a, . . . of the upper slitting blades 3, 3, . . . stand side by side at predetermined intervals with respect to an axial direction (i.e., the axial direction of the upper slitting blade shaft 1 and the lower slitting blade shaft 2). Also, the lower slitting blades 4, 4, . . . are fitted to the lower slitting blade shaft 2, such that cutting edges 4a, 4a, . . . of the lower slitting blades 4, 4, . . . stand side by side at the predetermined intervals with respect to the axial direction. The cutting edge 3a of each of the upper slitting blades 3, 3, . . . is located at the position adjacent to the cutting edge 4a of the corresponding lower slitting blade 4. The upper slitting blade 3 and the corresponding lower slitting blade 4 are paired with each other. As illustrated in FIG. 2, which is a view taken from the direction indicated by the arrow II of FIG. 1, the upper slitting blade 3 and the lower slitting blade 4, which are paired with each other, are located such that a region of the upper slitting blade 3 in the vicinity of the cutting edge 3a and a region of the lower slitting blade 4 in the vicinity of the cutting edge 4a overlap each other in the radial directions of the upper slitting blade 3 and the lower slitting blade 4 (i.e., the radial direction extending from the center point of the upper slitting blade shaft 1 and the radial direction extending from the center point of the lower slitting blade shaft 2).

An outer circumferential corner of each of the holders 20, 20, . . . , which outer circumferential corner is located on one side of the outer circumference of the holder 20 with respect to the axial direction (i.e., the right side of the outer circumference of the holder 20 in FIG. 1), is cut away in order to form a blade fitting concavity 21. The upper slitting blade 3 is fitted into the blade fitting concavity 21 and is urged by a spring 22 toward the one side with respect to the axial direction (i.e., the right side in FIG. 1). Also, an outer circumferential corner of each of the lower slitting blades 4, 4, . . . , which outer circumferential corner is located on one side of the outer circumference of the lower slitting blade 4 with respect to the axial direction (i.e., the right side of the outer circumference of the lower slitting blade 4 in FIG. 1), is cut away in order to form a cutting edge receiving concavity 23. The cutting edge receiving concavity 23 receives the cutting edge 3a of the corresponding upper slitting blade 3. At this time, since the upper slitting blade 3 is urged by the spring 22 toward the one side with respect to the axial direction (i.e., the right side in FIG. 1) as described above, the cutting edge 3a of the upper slitting blade 3 comes into contact with the cutting edge 4a of the lower slitting blade 4, and the position of the cutting edge 3a is thereby determined. Since the cutting edge receiving concavity 23 is formed in the lower slitting blade 4 as described above, the lower slitting blade 4 is constituted of a large diameter section 4f and a small diameter section 4g. As illustrated in FIG. 1, the large diameter section 4f and the small diameter section 4g may be formed as an integral body or may be formed as two independent sections. Also, in this embodiment, the cutting edge 4a is formed at the end of the outer circumferential surface of the large diameter section 4f, which end is located on the side opposite to the small diameter section 4g. Alternatively, the cutting edge 4a may be formed at the end of the outer circumferential surface of the large diameter section 4f, which end is located on the side of the small diameter section 4g.

In FIG. 1, only five upper slitting blades 3, 3, . . . and only six lower slitting blades 4, 4, . . . are shown. Actually, a larger number of upper slitting blades 3, 3, . . . and a larger number of lower slitting blades 4, 4, . . . are fitted respectively to the upper slitting blade shaft 1 and the lower slitting blade shaft 2 so as to stand side by side in the axial direction. Also, actually, the width of the magnetic tape web 5 extends even further in the axial direction.

Figure 3:
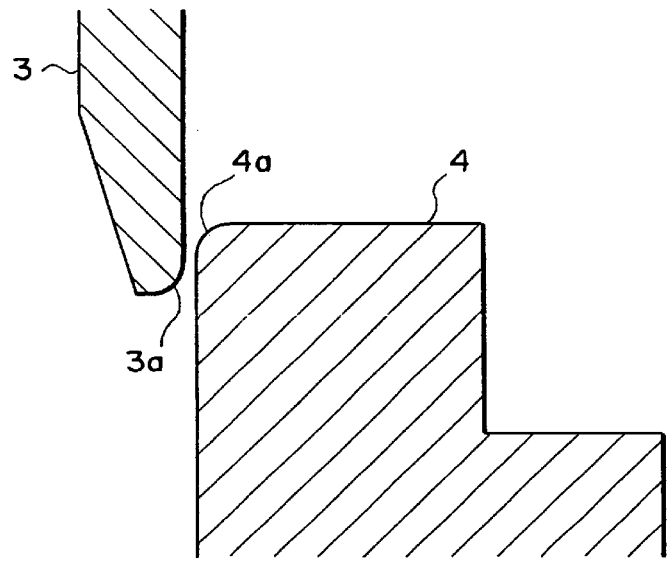
FIG. 3 is an enlarged sectional view showing a cutting edge of each of upper slitting blades and a cutting edge of each of lower slitting blades shown in FIG. 1, FIGS. 4A and 4B are explanatory views showing widths of a curved shape, which widths are taken in a radial direction and an axial direction.

FIG. 3 is an enlarged sectional view showing the cutting edge of each of the upper slitting blades 3, 3, . . . and the cutting edge of each of the lower slitting blades 4, 4, . . . As illustrated in FIG. 3, each of the cutting edge 3a of the upper slitting blade 3 and the cutting edge 4a of the lower slitting blade 4 does not have a sharp angular shape as in the conventional slitting apparatus, and has a curved shape.

Figure 4A:
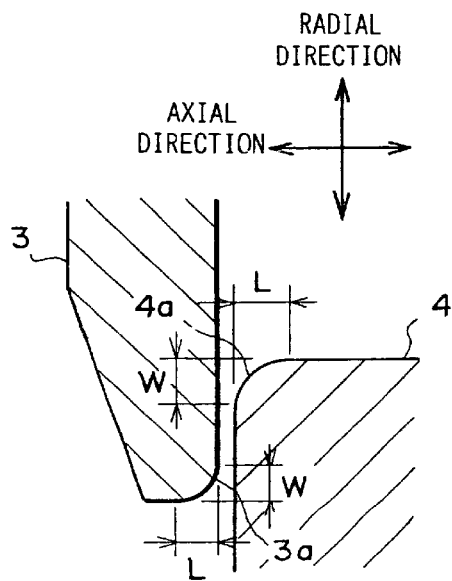
Figure 4B:
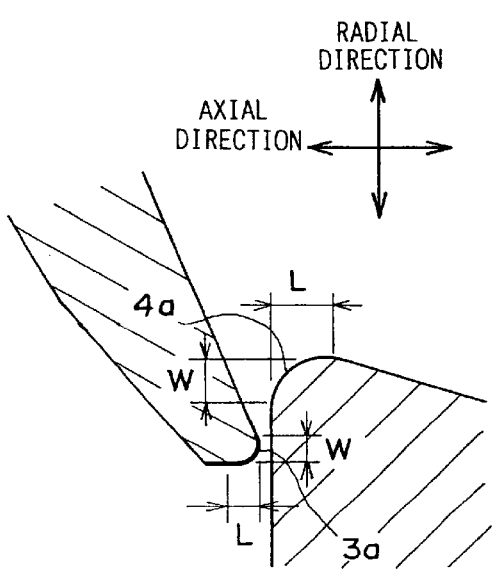

In this specification, as indexes for representing the degree of the curving, "width of a curved shape, which width is taken in a radial direction" and "width of a curved shape, which width is taken in an axial direction" are employed. As illustrated in FIGS. 4A and 4B, the term "width of a curved shape, which width is taken in a radial direction" as used herein means the width W of the curved shape of each of the cutting edge 3a of the upper slitting blade 3 having been fitted to the upper slitting blade shaft 1 and the cutting edge 4a of the lower slitting blade 4 having been fitted to the lower slitting blade shaft 2, which width is taken in the radial direction, as viewed from the axial direction. Also, as illustrated in FIGS. 4A and 4B, the term "width of a curved shape, which width is taken in an axial direction" as used herein means the width L of the curved shape of each of the cutting edge 3a of the upper slitting blade 3 having been fitted to the upper slitting blade shaft 1 and the cutting edge 4a of the lower slitting blade 4 having been fitted to the lower slitting blade shaft 2, which width is taken in the axial direction, as viewed from the radial direction. The term "curved shape" as used herein means the smoothly curved shape, such as a circular arc shape.

In this embodiment of the apparatus for slitting a magnetic tape web in accordance with the present invention, the upper slitting blade shaft 1 and the lower slitting blade shaft 2 are rotated by drive means (not shown), such as motors, and the upper slitting blades 3, 3, . . . and the lower slitting blades 4, 4, . . . are thereby rotated. As illustrated in FIG. 1, while the upper slitting blades 3, 3, . . . and the lower slitting blades 4, 4, . . . are being rotated, the magnetic tape web 5 having a wide width is moved between the upper slitting blades 3, 3, . . . and the lower slitting blades 4, 4, . . . and in the direction normal to the plane of the sheet of FIG. 1. In this manner, the magnetic tape web 5 is slit by the upper slitting blades 3, 3, . . . and the corresponding lower slitting blades 4, 4, . . . into a plurality of long narrow magnetic tapes 6, 6, . . . , which extend in the direction normal to the plane of the sheet of FIG. 1. (The area of the magnetic tape web 5 located between two adjacent upper slitting blades 3, 3 constitutes one magnetic tape 6.)

Figure 5:
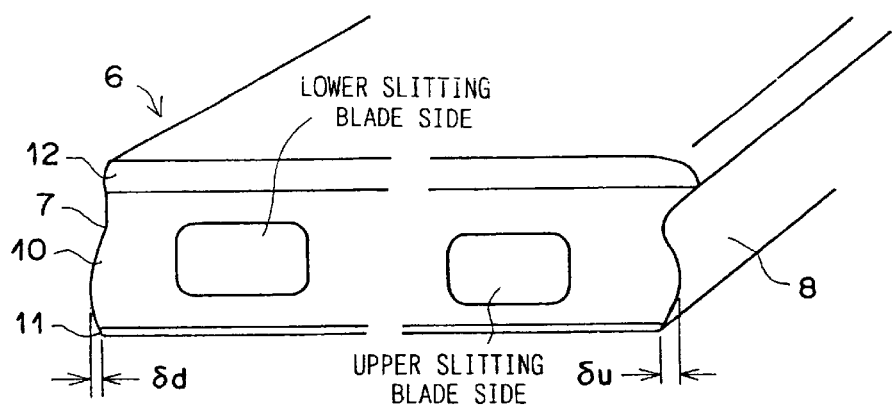
FIG. 5 is a perspective view showing a magnetic tape, which has been formed by the slitting apparatus shown in FIG. 1.

FIG. 5 is a perspective view showing a magnetic tape 6, which has been formed by the slitting apparatus shown in FIG. 1 from the magnetic tape web 5. As illustrated in FIG. 5, the magnetic tape 6 comprises the base layer 10, the back coating layer 11 overlaid on one surface side of the base layer 10, and the magnetic layer 12 overlaid on the other surface side of the base layer 10. The base layer 10 is formed from PET, PEN, an aramid, or the like. The back coating layer 11 is formed from carbon black, or the like. The magnetic layer 12 is formed from one of known magnetic materials.

In cases where the magnetic tape web 5 is slit by the slitting apparatus described above, the magnetic tapes 6, 6, . . . having the shape described below are obtained. Specifically, as illustrated in FIG. 5, the slit surfaces of each magnetic tape 6 constitute the side face 7 and the side face 8, which extend in the longitudinal direction of the magnetic tape 6. In this embodiment, each of the cutting edge 3a and the cutting edge 4a has the curved shape. Therefore, at the side face 8 on the upper slitting blade side, as in cases where the magnetic tape 6' is obtained from the slitting operation with the conventional cutting edge 3a' and the conventional cutting edge 4a' having the angular shape, the side face of the back coating layer 11 is located more inward than the side face of the base layer 10 by a distance of δu in the width direction of the magnetic tape 6. However, in this embodiment, the advantages over the cases where the magnetic tape 6' is obtained from the slitting operation with the conventional cutting edge 3a' and the conventional cutting edge 4a' having the angular shape are capable of being obtained in that, at the side face 7 on the lower slitting blade side, the side face of the back coating layer 11 is located more inward than the side face of the base layer 10 by a distance of δd in the width direction of the magnetic tape 6. Accordingly, it is possible to obtain the magnetic tape 6 having the shape such that, at each of the side faces 7 and 8 of the magnetic tape 6, the side face of the back coating layer 11 is located more inward than the side face of the base layer 10 in the width direction of the magnetic tape 6.

Figure 6:
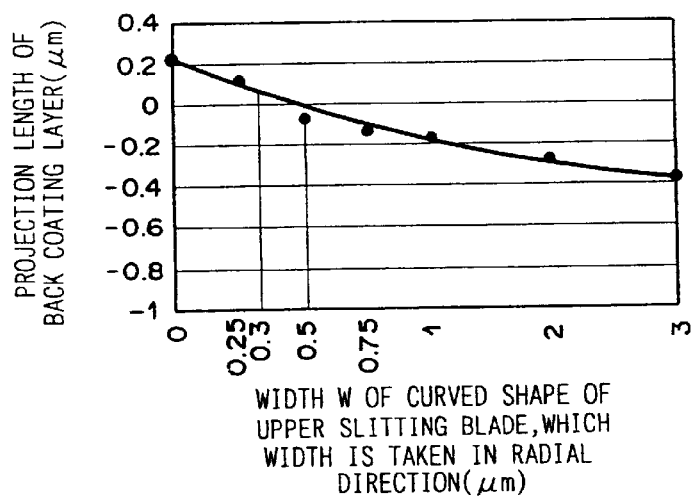
FIG. 6 is a graph showing relationship between the width of the curved shape of the cutting edge of each of the upper slitting blades, which width is taken in the radial direction, and a projection length of a back coating layer.
Figure 7:
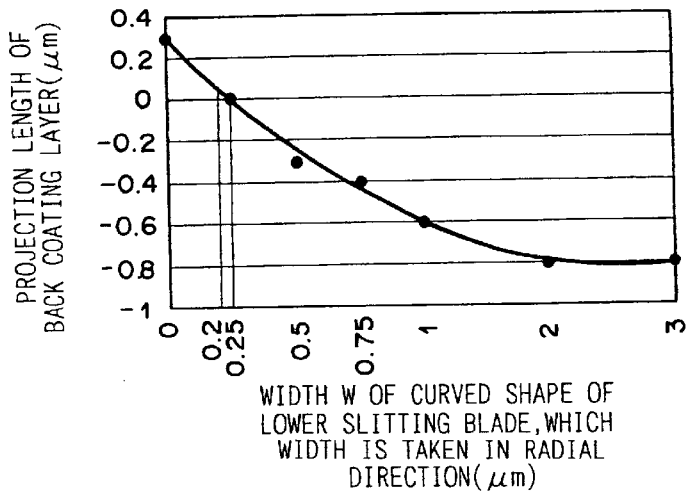
FIG. 7 is a graph showing relationship between the width of the curved shape of the cutting edge of each of the lower slitting blades, which width is taken in the radial direction, and the projection length of the back coating layer.

FIG. 6 is a graph showing relationship between the width W of the curved shape of the cutting edge 3a of each of the upper slitting blades 3, 3, . . . , which width is taken in the radial direction, and a projection length of the back coating layer 11 at the side face 7 of the magnetic tape 6 on the lower slitting blade side. (The term "projection length of a back coating layer" as used herein means the length by which the side face of the back coating layer 11 is projected more outwardly than the side face of the base layer 10 in the width direction of the magnetic tape 6.) FIG. 7 is a graph showing relationship between the width W of the curved shape of the cutting edge 4a of each of the lower slitting blades 4, 4, . . . , which width is taken in the radial direction, and the projection length of the back coating layer 11 at the side face 7 of the magnetic tape 6 on the lower slitting blade side. FIG. 6 shows the results obtained in cases where the cutting edge of each of the other slitting blades, i.e. the lower slitting blades, has a right-angled shape, and a magnetic tape web having a thickness of 7.5 μm is slit. FIG. 7 shows the results obtained in cases where the cutting edge of each of the other slitting blades, i.e. the upper slitting blades, has a right-angled shape, and a magnetic tape web having a thickness of 7.5 μm is slit.

As is clear from FIG. 6 and FIG. 7, in both the cases of the upper slitting blade 3 and the lower slitting blade 4, when the shape of the cutting edge is altered from the angular shape (in FIG. 6 and FIG. 7, the width W of the curved shape, which takes a value of 0, corresponds to the angular shape) to the curved shape, the projection length of the back coating layer 11 becomes small. Therefore, in cases where the shape of the cutting edge of at least either one of the upper slitting blade 3 and the lower slitting blade 4 is set at the curved shape, the projection length of the back coating layer 11 at the side face 7 on the lower slitting blade side is capable of being kept smaller than with the conventional cutting edge. Accordingly, the occurrence of scrapings of the back coating layer 11 during the movement of the magnetic tape 6 is capable of being restricted.

The projection length of the back coating layer 11 need not necessarily take a value of 0 or a minus value. (The projection length of the back coating layer 11 taking a minus value represents that the side face of the back coating layer 11 is located more inward than the side face of the base layer 10 in the width direction of the magnetic tape 6.) The projection length of the back coating layer 11 may take a slightly plus value, at which the occurrence of the scrapings of the back coating layer 11 does not cause problems to occur in practice. ((The projection length of the back coating layer 11 taking a plus value represents that the side face of the back coating layer 11 is located more outward than the side face of the base layer 10 in the width direction of the magnetic tape 6.) Experiments made by the inventors revealed that, in cases where the projection length of the back coating layer 11 is at most approximately 0.05 μm, little problem occurs due to the scrapings of the back coating layer 11. Therefore, the projection length of the back coating layer 11 should preferably be at most approximately 0.05 μm. In order for the occurrence of the scrapings of the back coating layer 11 to be eliminated, the projection length of the back coating layer 11 should more preferably be at most 0 μm.

In order for the projection length of the back coating layer 11 to be kept approximately at the value described above, as for the upper slitting blade 3, the width W of the curved shape, which width is taken in the radial direction, should preferably be at least 0.3 μm (which corresponds to the projection length of the back coating layer 11 of approximately 0.05 μm in FIG. 6), and should more preferably be at least 0.5 μm (which corresponds to the projection length of the back coating layer 11 of 0 μm in FIG. 6). As for the lower slitting blade 4, the width W of the curved shape, which width is taken in the radial direction, should preferably be at least 0.2 μm (which corresponds to the projection length of the back coating layer 11 of approximately 0.05 μm in FIG. 7), and should more preferably be at least 0.25 μm (which corresponds to the projection length of the back coating layer 11 of 0 μm in FIG. 7).

If the width W of the curved shape, which width is taken in the radial direction, becomes large, the slitting performance (i.e., the cutting performance) will become bad. Therefore, in order for the desired slitting performance to be ensured, the width W of the curved shape, which width is taken in the radial direction, should preferably be at most 3 μm, and should more preferably be at most 1 μm.

Therefore, from the view points of the projection length of the back coating layer 11 and the slitting performance, as for the upper slitting blade 3, the width W of the curved shape of the cutting edge 3a, which width is taken in the radial direction, should preferably fall within the range of 0.3 μm to 3 μm, and should more preferably fall within the range of 0.5 μm to 1 μm. Also, as for the lower slitting blade 4, the width W of the curved shape of the cutting edge 4a, which width is taken in the radial direction, should preferably fall within the range of 0.2 μm to 3 μm, and should more preferably fall within the range of 0.25 μm to 1 μm.

The results shown in FIG. 6 and FIG. 7 are the results obtained from the experiments made on the magnetic tape web having a thickness of 7.5 μm. Actually, the projection length of the back coating layer 11 varies slightly for different thicknesses of the magnetic tape webs, different strengths of the base layers, different slitting conditions, and the like. However, the variations of the projection length of the back coating layer 11 are not large. In almost all cases, regardless of the thickness of the magnetic tape web, the strength of the base layer, and the slitting conditions, if the width W of the curved shape, which width is taken in the radial direction, falls within the range described above, the projection length of the back coating layer 11 is capable of being minimized such that the problems due to the scrapings of the back coating layer 11 do not occur in practice.

As described above, the projection length of the back coating layer 11 varies in accordance with the width W of the curved shape of the cutting edge, which width is taken in the radial direction. In such cases, it is presumed that, if the width L of the curved shape of the cutting edge, which width is taken in the axial direction, is smaller than the width W of the curved shape of the cutting edge, which width is taken in the radial direction, even though the cutting edge has the curved shape, the problems will often occur in that the effects of reducing the projection length of the back coating layer 11, in particular the effects of setting the projection length of the back coating layer 11 at a minus value, cannot be obtained. Therefore, the curved shape of the cutting edge should preferably be set such that the width W of the curved shape, which width is taken in the radial direction, is equal to at most the width L of the curved shape, which width is taken in the axial direction. (Specifically, the curved shape of the cutting edge should preferably be set such that $W \leq L$.) In cases where $W \leq L$, the effects of reducing the projection length of the back coating layer 11 can be expected in accordance with the width W of the curved shape, which width is taken in the radial direction. The results shown in FIG. 6 have been obtained by utilizing the upper slitting blades, which have the cutting edges having the curved shapes of L=1.2 W to 1.5 W. Also, the results shown in FIG. 7 have been obtained by utilizing the lower slitting blades, which have the cutting edges having the curved shapes of L=1.2 W to 1.5 W.

Figure 8:
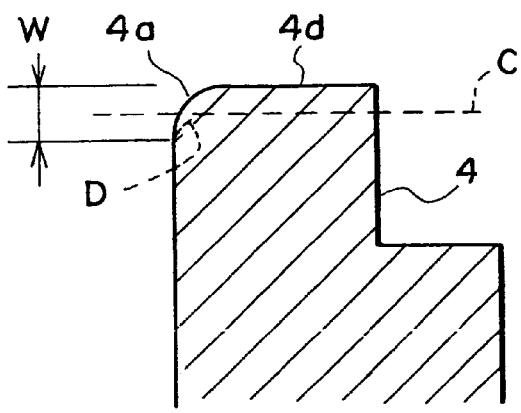
FIG. 8 is an explanatory view showing an example of a procedure for polishing each of the lower slitting blades.
Figure 9:
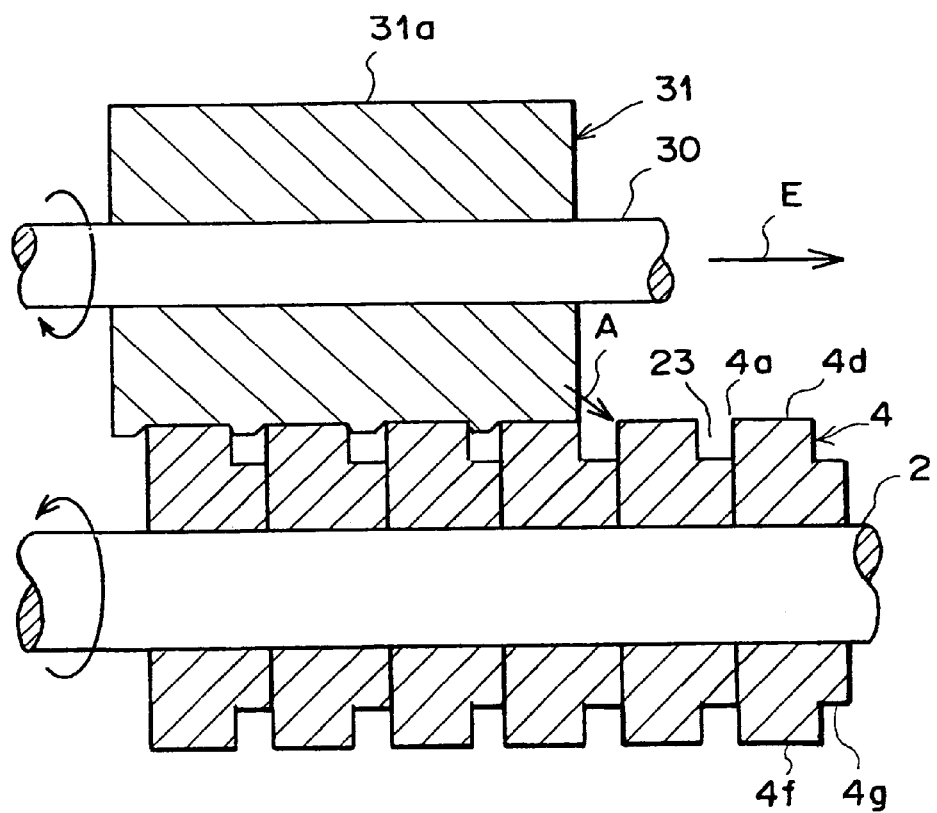
FIG. 9 is an explanatory view showing an example of how the lower slitting blades are polished.
Figure 10:
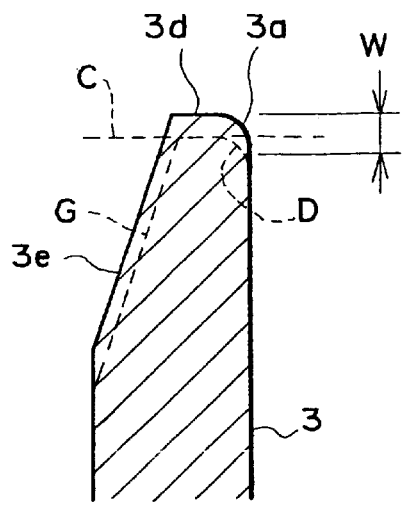
FIG. 10 is an explanatory view showing an example of a procedure for polishing each of the upper slitting blades.
Figure 11:
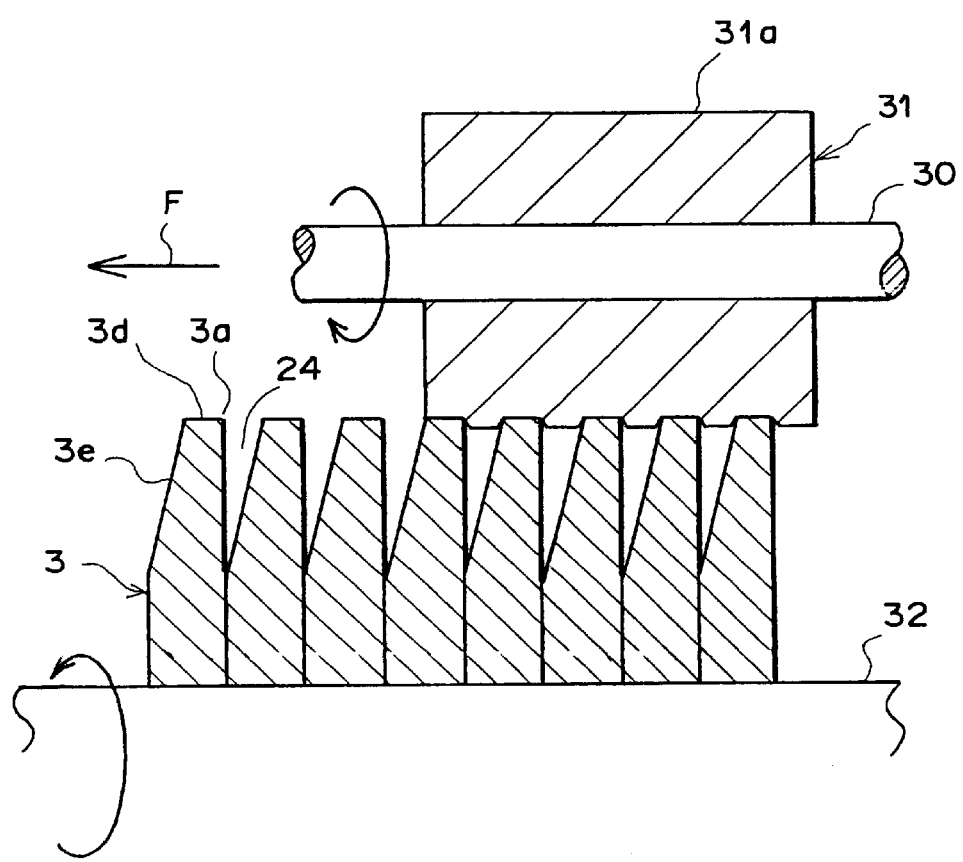
FIG. 11 is an explanatory view showing an example of how the upper slitting blades are polished.

FIG. 8 is an explanatory view showing an example of a procedure for polishing the cutting edge 4a of each of the lower slitting blades 4, 4, . . . into the curved shape. FIG. 9 is an explanatory view showing an example of how the cutting edges 4a, 4a, . . . of the lower slitting blades 4, 4, . . . are polished. FIG. 10 is an explanatory view showing an example of a procedure for polishing the cutting edge 3a of each of the upper slitting blades 3, 3, . . . FIG. 11 is an explanatory view showing an example of how the cutting edges 3a, 3a, . . . of the upper slitting blades 3, 3, . . . are polished. When the upper slitting blades 3, 3, . . . and the lower slitting blades 4, 4, . . . are used for the slitting for a long period, the slitting performance of upper slitting blades 3, 3, . . . and the lower slitting blades 4, 4, . . . becomes low due to wear. In such cases, it is necessary for the cutting edges 3a, 3a, . . . and the cutting edges 4a, 4a, . . . to be polished into the correct curved shape.

How the cutting edges 4a, 4a, . . . of the lower slitting blades 4, 4, . . . are polished will firstly be described hereinbelow. As for the lower slitting blades 4, 4, . . . , if the intervals among the cutting edges 4a, 4a, . . . vary, the widths of the magnetic tapes 6, 6, . . . formed with the cutting edges 4a, 4a, . . . will vary. Therefore, the positions of the lower slitting blades 4, 4, . . . on the lower slitting blade shaft 2 have been adjusted accurately such that the intervals among the cutting edges 4a, 4a, . . . are uniform. Accordingly, if the lower slitting blades 4, 4, . . . are removed from the lower slitting blade shaft 2, considerable time and labor will be required to again accurately fit the lower slitting blades 4, 4, . . . to the lower slitting blade shaft 2. For the reasons described above, after the lower slitting blades 4, 4, . . . have once been fitted to the lower slitting blade shaft 2, the polishing operation should preferably be performed while the lower slitting blades 4, 4, . . . are being kept in the state in which the lower slitting blades 4, 4, . . . are fitted to the lower slitting blade shaft 2.

As illustrated in FIG. 8, after the use of the lower slitting blade 4 for a long period, the width W of the curved shape of the cutting edge 4a, which width is taken in the radial direction, becomes large due to wear. Therefore, when the polishing operation is to be performed on the cutting edge 4a, firstly, an outer circumferential surface 4d of the lower slitting blade 4 is cylindrically ground to the depth indicated by the broken line C. Specifically, for example, while the lower slitting blades 4, 4, . . . are being kept in the state, in which the lower slitting blades 4, 4, . . . are fitted to the lower slitting blade shaft 2, the lower slitting blades 4, 4, . . . are rotated together with the lower slitting blade shaft 2. Also, a cylindrical whetstone for rough grinding, which has a mesh size of #200 to #1000, is rotated, and the outer circumferential surface of the cylindrical whetstone is pushed against the outer circumferential surfaces 4d, 4d, . . . of the lower slitting blades 4, 4, . . . , which are being rotated. In this state, the cylindrical whetstone for rough grinding is moved in the axial direction of the lower slitting blade shaft 2, and all of the outer circumferential surfaces 4d, 4d, . . . of the lower slitting blades 4, 4, . . . are thereby roughly ground to the depth indicated by the broken line C. Alternatively, after rough grinding has been performed, finish grinding may be performed with a cylindrical whetstone for finish grinding, which has a fine mesh size of #1500 to #8000, and in the same manner as that in the rough grinding described above in order to grind the outer circumferential surfaces 4d, 4d, . . . of the lower slitting blades 4, 4, . . . to the depth indicated by the broken line C.

Thereafter, each of the cutting edges 4a, 4a, . . . is polished to the depth indicated by the broken line D in FIG. 8, and a cutting edge having the original correct curved shape is thereby formed. The polishing of the cutting edges 4a, 4a, . . . is performed with the technique shown in FIG. 9. Specifically, as illustrated in FIG. 9, while the lower slitting blades 4, 4, . . . are being kept in the state, in which the lower slitting blades 4, 4, . . . are fitted to the lower slitting blade shaft 2, the lower slitting blades 4, 4, . . . are rotated together with the lower slitting blade shaft 2. Also, a cylindrical resilient whetstone 31, which has been secured to a whetstone shaft 30 located in parallel with the lower slitting blade shaft 2, is rotated, and an outer circumferential surface 31a of the resilient whetstone 31 is pushed with a predetermined pushing force against the outer circumferential surfaces 4d, 4d, . . . of the lower slitting blades 4, 4, . . . , which are being rotated. (The term "resilient whetstone" as used herein means the whetstone, which has a hardness equivalent to a Rockwell hardness of 60, as measured on the scale L, or a hardness softer than the Rockwell hardness of 60, as measured on the scale L.) In this state, the resilient whetstone 31 is moved to the right side in FIG. 9 in the axial direction (i.e., in the direction indicated by the arrow E). In this manner, the polishing operation is performed. As illustrated in FIG. 9, in cases where the outer circumferential surface 31a of the resilient whetstone 31 is pushed against the outer circumferential surfaces 4d, 4d, . . . of the lower slitting blades 4, 4, . . . in the manner described above, the regions of the outer circumferential surface 31a of the resilient whetstone 31, which regions are in contact with the outer circumferential surfaces 4d, 4d, . . . of the lower slitting blades 4, 4, . . . , become depressed in the radial direction. Also, the regions of the outer circumferential surface 31a of the resilient whetstone 31, which regions stand facing the cutting edge receiving concavities 23, 23, . . . , become protruded in the radial direction into the cutting edge receiving concavities 23, 23, . . . The protruded regions of the resilient whetstone 31 come into contact with the cutting edges 4a, 4a, . . . of the lower slitting blades 4, 4, . . . so as to cover the cutting edges 4a, 4a, . . . As a result, the cutting edges 4a, 4a, . . . are polished into the curved shape.

In cases where the lower slitting blades 4, 4, . . . are to be polished with a conventional hard whetstone, while the lower slitting blades 4, 4, . . . are being kept in the state, in which the lower slitting blades 4, 4, . . . are fitted to the lower slitting blade shaft 2, it is necessary for the whetstone to be pushed against each of the cutting edges 4a, 4a, . . . from the direction indicated by the arrow A and within the cutting edge receiving concavity 23. In such cases, the cutting edge receiving concavity 23 is narrow, and it is not always possible to perform the polishing operation with the conventional hard whetstone in the manner described above. Also, the problems occur in that the cutting edges 4a, 4a, . . . must be polished one by one, and considerable time and cost are required to perform the polishing operation. However, in cases where the polishing operation is performed with the resilient whetstone 31 in the manner described above, the polishing operation is capable of being performed while the lower slitting blades 4, 4, . . . are being kept in the state, in which the lower slitting blades 4, 4, . . . are fitted to the lower slitting blade shaft 2, and a plurality of the cutting edges 4a, 4a, . . . are capable of being polished simultaneously.

How the cutting edges 3a, 3a, . . . of the upper slitting blades 3, 3, . . . are polished will be described hereinbelow. As for the upper slitting blades 3, 3, . . . , since each of the upper slitting blades 3, 3, . . . is urged by the spring 22 and pushed against the cutting edge 4a of the corresponding lower slitting blade 4. In this manner, the position of each upper slitting blade 3 is determined. Therefore, the positioning accuracy of the upper slitting blades 3, 3, . . . themselves on the upper slitting blade shaft 1 may not be kept particularly high. Accordingly, when the upper slitting blades 3, 3, . . . are to be polished, the upper slitting blades 3, 3, . . . are removed from the upper slitting blade shaft 1. Also, as illustrated in FIG. 11, the upper slitting blades 3, 3, . . . are fitted to a shaft 32 for the polishing operation, which has been prepared previously, such that the upper slitting blades 3, 3, . . . are located side by side and are in close contact with one another. In this state, the polishing operation on the upper slitting blades 3, 3, . . . is performed.

As illustrated in FIG. 10, as in the cases of the lower slitting blade 4, after the use of the upper slitting blade 3 for a long period, the width W of the curved shape of the cutting edge 3a, which width is taken in the radial direction, becomes large due to wear. Therefore, when the polishing operation is to be performed on the cutting edge 3a, firstly, an outer circumferential surface 3d of the upper slitting blade 3 is cylindrically ground to the depth indicated by the broken line C. Specifically, as illustrated in FIG. 11, a plurality of the upper slitting blades 3, 3, . . . are fitted to the shaft 32 for the polishing operation, such that the upper slitting blades 3, 3, . . . stand side by side in close contact with one another. Thereafter, as in the cases of the lower slitting blades 4, 4, . . . , the upper slitting blades 3, 3, . . . are rotated. Also, a cylindrical whetstone for rough grinding, which has a mesh size of #200 to #1000, is rotated, and the outer circumferential surface of the cylindrical whetstone is pushed against the outer circumferential surfaces 3d, 3d, . . . of the upper slitting blades 3, 3, . . . , which are being rotated. In this state, the cylindrical whetstone for rough grinding is moved in the axial direction of the shaft 32 for the polishing operation, and all of the outer circumferential surfaces 3d, 3d, of the upper slitting blades 3, 3, . . . are thereby roughly ground to the depth indicated by the broken line C. Alternatively, after rough grinding has been performed, finish grinding maybe performed with a cylindrical whetstone for finish grinding, which has a fine mesh size of #1500 to #8000, and in the same manner as that in the rough grinding described above in order to grind the outer circumferential surfaces 3d, 3d, . . . of the upper slitting blades 3, 3, . . . to the depth indicated by the broken line C.

Thereafter, each of the cutting edges 3a, 3a, . . . is polished with a resilient whetstone, and a cutting edge having the correct curved shape is thereby formed. The polishing of the cutting edges 3a, 3a, . . . is performed with the same technique as that employed for the cutting edges 4a, 4a, . . . Specifically, as illustrated in FIG. 11, the upper slitting blades 3, 3, . . . are rotated together with the shaft 32 for the polishing operation. Also, the cylindrical resilient whetstone 31 described above, which has been secured to the whetstone shaft 30 located in parallel with the shaft 32 for the polishing operation, is rotated, and the outer circumferential surface 31a of the resilient whetstone 31 is pushed with a predetermined pushing force against the outer circumferential surfaces 3d, 3d, . . . of the upper slitting blades 3, 3, . . . , which are being rotated. In this state, the resilient whetstone 31 is moved to the left side in FIG. 11 in the axial direction (i.e., in the direction indicated by the arrow F). In this manner, the polishing operation is performed. As illustrated in FIG. 11, in cases where the outer circumferential surface 31a of the resilient whetstone 31 is pushed against the outer circumferential surfaces 3d, 3d, . . . of the upper slitting blades 3, 3, . . . in the manner described above, the regions of the outer circumferential surface 31a of the resilient whetstone 31, which regions are in contact with the outer circumferential surfaces 3d, 3d, . . . of the upper slitting blades 3, 3, . . . , become depressed in the radial direction. Also, the regions of the outer circumferential surface 31a of the resilient whetstone 31, which regions stand facing back oblique surface-corresponding concavities 24, 24, . . . , which are formed by back oblique surfaces 3e, 3e, . . . of the upper slitting blades 3, 3, . . . , become protruded in the radial direction into the back oblique surface-corresponding concavities 24, 24, . . . The protruded regions of the resilient whetstone 31 come into contact with the cutting edges 3a, 3a, . . . of the upper slitting blades 3, 3, . . . so as to cover the cutting edges 3a, 3a, . . . As a result, the cutting edges 3a, 3a, . . . are polished into the curved shape.

After the cutting edges 3a, 3a, . . . have been polished in the manner described above, the upper slitting blades 3, 3, . . . are removed from the shaft 32 for the polishing operation. Also, the back oblique surface 3e of each of the upper slitting blades 3, 3, . . . is ground to the depth indicated by the broken line G in FIG. 10. In this manner, the upper slitting blades 3, 3, . . . having the original shape are obtained. Thereafter, as illustrated in FIG. 1, the upper slitting blades 3, 3, . . . are fitted to the upper slitting blade shaft 1.

With the polishing technique described above, a plurality of the cutting edges 3a, 3a, . . . of the upper slitting blades 3, 3, . . . are capable of being polished simultaneously, while the upper slitting blades 3, 3, . . . are being located such that the upper slitting blades 3, 3, . . . stand side by side in close contact with each other. Also, in cases where the resilient whetstone 31 is pushed against the outer circumferential surfaces 3d, 3d, . . . of the upper slitting blades 3, 3, . . . in the manner described above in order to polish the cutting edges 3a, 3a, . . . , the relationship between the width W of the curved shape, which width is taken in the radial direction, and the width L of the curved shape, which width is taken in the axial direction, can naturally be obtained such that W≦L.

As described above, the desirable curved shape of the lower slitting blade 4 is a markedly fine shape such that the width W of the curved shape, which width is taken in the radial direction, falls within the range of 0.2 μm to 3 μm. However, even if the apparatus has a markedly high accuracy, in cases where the lower slitting blades 4, 4, . . . having been fitted to the lower slitting blade shaft 2 are rotated, the cutting edges 4a, 4a, . . . will wobble by approximately 3 μm in the radial direction and approximately 1 μm in the axial direction during the rotation due to the processing accuracy of the lower slitting blade shaft 2, the processing accuracy of the lower slitting blades 4, 4, . . . , the accuracy with which the lower slitting blades 4, 4, . . . are fitted to the lower slitting blade shaft 2, deflection of the lower slitting blade shaft 2 during the rotation, or the like. With the conventional polishing technique utilizing a whetstone having the ordinarily employed hardness, wherein the polishing operation is performed regardless of the wobbling of the cutting edges, if the wobbling occurs, the degree of polishing will vary for different positions in the circumferential direction due to the wobbling. Therefore, with the conventional polishing technique, it is not always possible to form the fine curved shape described above uniformly with respect to various different positions in the circumferential direction. Also, as described above, in the cases of the upper slitting blade 3, the desirable curved shape of the upper slitting blade 3 is a markedly fine shape such that the width W of the curved shape, which width is taken in the radial direction, falls within the range of 0.3 μm to 3 μm. However, in cases where the upper slitting blades 3, 3, . . . having been fitted to the shaft 32 for the polishing operation so as to stand side by side in close contact with one another are rotated and polished with the conventional polishing technique utilizing a whetstone having the ordinarily employed hardness, due to the wobbling of the cutting edges, it is not always possible to form the fine curved shape described above uniformly with respect to various different positions in the circumferential direction. However, with the embodiment in accordance with the present invention, wherein the resilient whetstone 31 is pushed against the upper slitting blades 3, 3, . . . or the lower slitting blades 4, 4, . . . in order to polish the cutting edges, since the resilient whetstone 31 is soft, even if the cutting edges wobble in the radial direction and the axial direction, the outer circumferential surface 31a of the resilient whetstone 31 becomes depressed so as to follow the wobbling of the cutting edges. Therefore, regardless of the wobbling of the cutting edges, the fine curved shape defined above, such that the width W of the curved shape, which width is taken in the radial direction, falls within the range of 0.2 μm to 3 μm or falls within the range of 0.3 μm to 3 μm, is capable of being formed uniformly in the circumferential direction.

In the embodiment described above, after the cutting edges have become worn, the polishing operation is performed to for the cutting edges having the correct curved shapes. The polishing technique utilizing the resilient whetstone 31 is also applicable when the cutting edges are originally formed.

Figure 12:
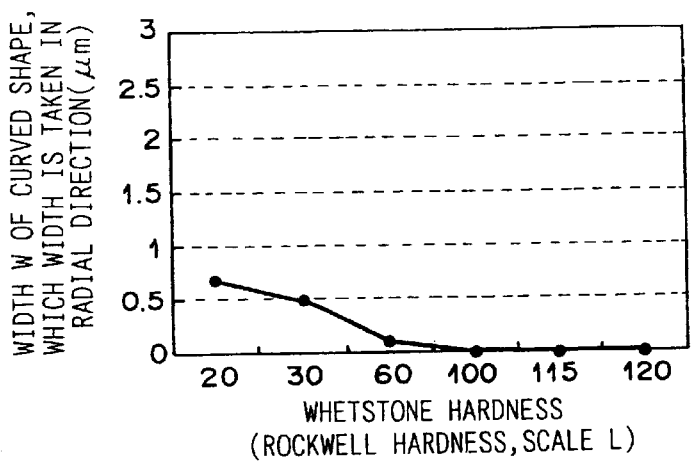
FIG. 12 is a graph showing an example of relationship between hardness of a whetstone and the width of the curved shape, which width is taken in the radial direction.
Figure 13:
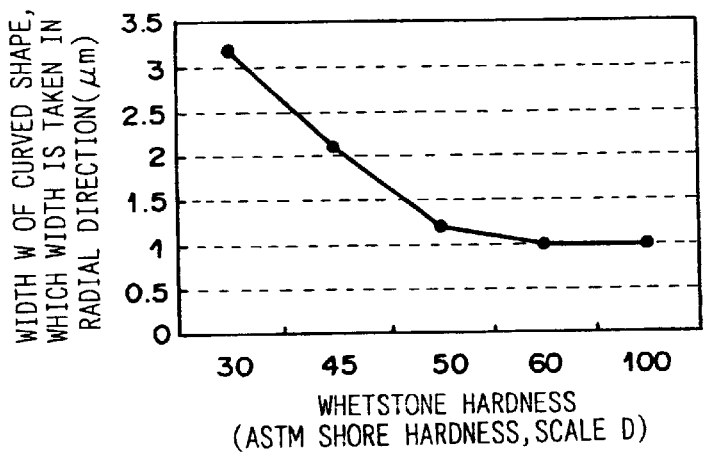
FIG. 13 is a graph showing a different example of relationship between hardness of a whetstone and the width of the curved shape, which width is taken in the radial direction.
Figure 14:
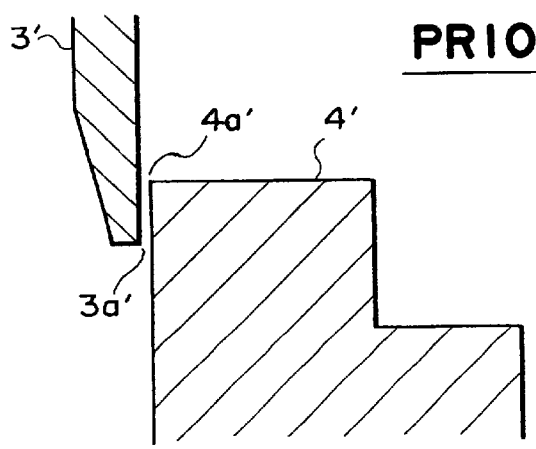
FIG. 14 is an enlarged sectional view showing a cutting edge of each of conventional upper slitting blades and a cutting edge of each of conventional lower slitting blades.
Figure 15:
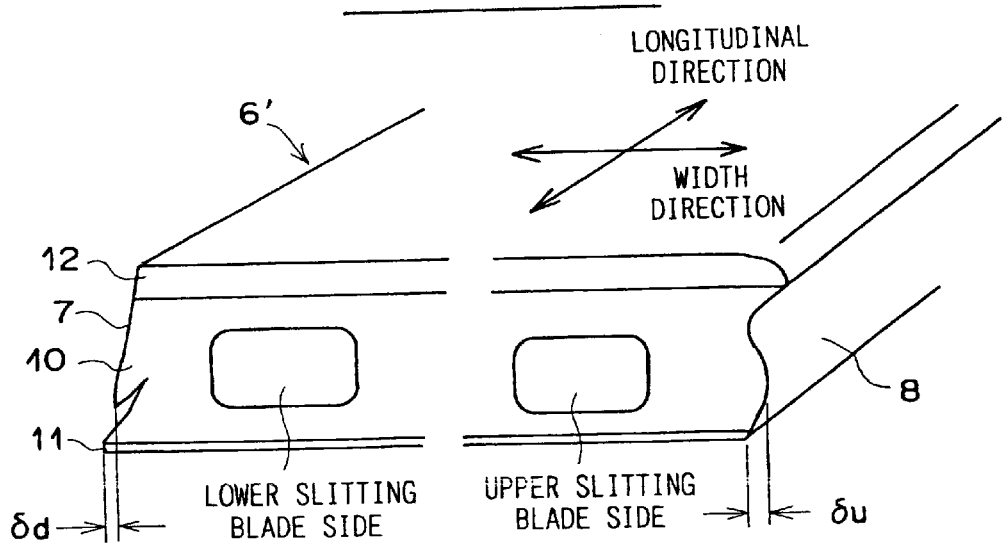
FIG. 15 is a perspective view showing a magnetic tape, which has been formed from a slitting operation with the conventional upper slitting blades and the conventional lower slitting blades.

FIGS. 12 and 13 are graphs showing examples of relationships between hardness of a whetstone and the width W of the curved shape, which width is taken in the radial direction, the relationship being obtained when the cutting edges are polished with the whetstone in the manner described above. FIG. 12 is a graph showing an example of relationship between Rockwell hardness of a whetstone, as measured on a scale L, and the width W of the curved shape, which width is taken in the radial direction, the relationship being obtained when the cutting edges are polished with the whetstone. FIG. 13 is a graph showing an example of relationship between ASTM Shore hardness of a whetstone, as measured on a scale D, and the width W of the curved shape, which width is taken in the radial direction, the relationship being obtained when the cutting edges are polished with the whetstone. Shore hardnesses of 30 to 100, as measured on the scale D, which are shown in FIG. 13 correspond to hardnesses softer than the Rockwell hardness of 0, as measured on the scale L, which is shown in FIG. 12. The Rockwell hardness, as measured on the scale L, and the ASTM Shore hardness, as measured on the scale D, are described in detail in, for example, "Measuring Management Technique Library (7): Hardness" published by Corona Co., Kentaro Yamamoto and Kozo Iizuka, edited by Measuring Management Society of Japan.

As illustrated in FIG. 12 and FIG. 13, in cases where a whetstone is hard (i.e., has a high hardness) and the outer circumferential surface of the whetstone is pushed against the outer circumferential surfaces 3d, 3d, . . . of the upper slitting blades 3, 3, . . . or the outer circumferential surfaces 4d, 4d, . . . of the lower slitting blades 4, 4, . . . , the length of protrusion, by which the outer circumferential surface of the whetstone enters into the cutting edge receiving concavities 23, 23, . . . (in the cases of the lower slitting blades 4, 4, . . . ) or the back oblique surface-corresponding concavities 24, 24, . . . (in the cases of the upper slitting blades 3, 3, . . . ), is small. Therefore, in such cases, the cutting edges cannot be polished into the curved shape. However, in cases where a soft whetstone is employed, the length of protrusion, by which the outer circumferential surface of the whetstone enters into the cutting edge receiving concavities 23, 23, . . . or the back oblique surface-corresponding concavities 24, 24, . . . , becomes large, and the range, over which the outer circumferential surface of the whetstone covers the cutting edges, becomes wide. As a result, the cutting edges are capable of being polished into a curved shape having a large width W, which width is taken in the radial direction.

Also, in such cases, the relationships between the hardness of the whetstone and the width W of the curved shape taken in the radial direction, which relationships are shown in FIG. 12 and FIG. 13, are obtained. As clear from FIG. 12 and FIG. 13, in cases where the hardness of the whetstone is equivalent to the Rockwell hardness of 60, as measured on the scale L, or is softer than the Rockwell hardness of 60, as measured on the scale L, the cutting edges are capable of being polished into the curved shape. (The hardnesses softer than the Rockwell hardness of 60, as measured on the scale L, include the Shore hardnesses of 30 to 100, as measured on the scale D.) As described above, the desirable range of the width W of the curved shape, which width is taken in the radial direction, is 0.3 μm to 3 μm for the upper slitting blades and is 0.2 μm to 3 μm for the lower slitting blades. The Rockwell hardness, as measured on the scale L, corresponding to the width W of the curved shape taken in the radial direction, which width falls within the range of 0.2 μm to 3 μm, is approximately 45. Therefore, hardness of the whetstone utilized for the polishing of the cutting edges should more preferably be equivalent to the Rockwell hardness of 45, as measured on the scale L, or be softer than the Rockwell hardness of 45, as measured on the scale L.

The method and apparatus for slitting a magnetic tape web in accordance with the present invention may be embodied in various other ways. Also, besides the slitting of the magnetic tape web, the method and apparatus for slitting a magnetic tape web in accordance with the present invention are also applicable to the slitting of various other kinds of sheet-like materials and are capable of being employed appropriately for the slitting of, in particular, photographic silver halide materials.

In addition, all of the contents of Japanese Patent Application Nos. 2000-13839 and 2000-86718 are incorporated into this specification by reference.

What is claimed is:

1. A magnetic tape, comprising:
   i) a base layer,
   ii) a back coating layer overlaid on one surface side of the base layer, and
   iii) a magnetic layer overlaid on the other surface side of the base layer,
   wherein, at each of two cut side faces of the magnetic tape, which cut side faces are located at opposite ends of the magnetic tape with respect to a width direction of the magnetic tape, a cut side face of the back coating layer is in the same plane as a cut side face of the base layer or is located more inward than the cut side face of the base layer in the width direction of the magnetic tape.

2. A method of slitting a magnetic tape web, comprising the steps of:
   i) locating a plurality of upper slitting blades and a plurality of lower slitting blades such that each of the upper slitting blades stands facing one of the lower slitting blades, the upper slitting blade and the lower slitting blade, which stand facing each other, being located such that a cutting edge vicinity region of the upper slitting blade and a cutting edge vicinity region of the lower slitting blade overlap each other in a radial direction, and
   ii) rotating the plurality of the upper slitting blades and the plurality of the lower slitting blades to slit a magnetic tape web into magnetic tapes,
   wherein a cutting edge of each of the upper slitting blades and/or a cutting edge of each of the lower slitting blades has a curved shape.

3. An apparatus for slitting a magnetic tape web, comprising:
   i) a plurality of upper slitting blades and a plurality of lower slitting blades, which are located such that each of the upper slitting blades stands facing one of the lower slitting blades, the upper slitting blade and the lower slitting blade, which stand facing each other, being located such that a cutting edge vicinity region of the upper slitting blade and a cutting edge vicinity region of the lower slitting blade overlap each other in a radial direction, and
   ii) means for rotating the plurality of the upper slitting blades and the plurality of the lower slitting blades to slit a magnetic tape web into magnetic tapes,
   wherein a cutting edge of each of the upper slitting blades and/or a cutting edge of each of the lower slitting blades has a curved shape.

4. An apparatus for slitting a magnetic tape web as defined in claim 3 wherein the cutting edge of each of the lower slitting blades has the curved shape, and a width of the curved shape of the cutting edge of each of the lower slitting blades, which width is taken in the radial direction, falls within the range of 0.2 μm to 3 μm.

5. An apparatus for slitting a magnetic tape web as defined in claim 3 or 4 wherein the cutting edge of each of the upper slitting blades has the curved shape, and a width of the curved shape of the cutting edge of each of the upper slitting blades, which width is taken in the radial direction, falls within the range of 0.3 μm to 3 μm.

6. A method of polishing magnetic tape web slitting blades, in which cutting edges of circular upper slitting blades or cutting edges of circular lower slitting blades are polished, the circular upper slitting blades and the circular lower slitting blades being for use in an apparatus for slitting a magnetic tape web, wherein a magnetic tape web is slit into magnetic tapes with a plurality of the circular upper slitting blades, which are fitted to an upper slitting blade shaft so as to stand side by side in an axial direction, and a plurality of the circular lower slitting blades, which are fitted to a lower slitting blade shaft so as to stand side by side in the axial direction, the method comprising the steps of:
   i) rotating the upper slitting blades or the lower slitting blades, and
   ii) pushing a whetstone, which has a hardness equal to at most a hardness equivalent to a Rockwell hardness of 60, as measured on a scale L, against outer circumferential surfaces of the upper slitting blades or outer circumferential surfaces of the lower slitting blades to polish the cutting edge of each of the upper slitting blades or the cutting edge of each of the lower slitting blades into a curved shape.

7. A method of polishing magnetic tape web slitting blades as defined in claim 6 wherein each of the lower slitting blades has a large diameter section and a small diameter section,
   the cutting edge of each of the lower slitting blades is formed at an end of the outer circumferential surface of the large diameter section,
   the lower slitting blades are kept in a state, in which the lower slitting blades are fitted to the lower slitting blade shaft,
   the lower slitting blades are rotated together with the lower slitting blade shaft, and
   the whetstone is pushed against the outer circumferential surfaces of the lower slitting blades, while the lower slitting blades are being rotated, to polish the cutting edge of each of the lower slitting blades into the curved shape.

8. A method of polishing magnetic tape web slitting blades as defined in claim 6 wherein the cutting edge of each of the upper slitting blades is formed at one of ends of the outer circumferential surface of each of the upper slitting blades, a back oblique surface is formed at the other end side of the outer circumferential surface of each of the upper slitting blades, the upper slitting blades are set in a state, in which the upper slitting blades are fitted to a shaft for a polishing operation, such that the upper slitting blades stand side by side and are in close contact with one another, the upper slitting blades are rotated together with the shaft for the polishing operation, and the whetstone is pushed against the outer circumferential surfaces of the upper slitting blades, while the upper slitting blades are being rotated, to polish the cutting edge of each of the upper slitting blades into the curved shape.

9. An apparatus for slitting a magnetic tape web into magnetic tape having a base layer, a back coating layer overlaid on one surface side of the base layer, and a magnetic layer overlaid on the other surface side of the base layer, comprising:

a plurality of upper slitting means and a plurality of lower slitting means for slitting the magnetic tape web, such that once the magnetic tape web is slit into the magnetic tape, at each of two cut side faces of the magnetic tape, which cut side faces are located at opposite ends of the magnetic tape with respect to a width direction of the magnetic tape, a cut side face of the back coating layer is in the same plane as a cut side face of the base layer or is located more inward than the cut side face of the base layer in the width direction of the magnetic tape; and means for rotating the plurality of the upper slitting means and the plurality of the lower slitting means, wherein, each of the upper slitting means stands facing one of the lower slitting means, and wherein, the upper slitting means and the lower slitting means, which stand facing each other, are located such that a cutting edge vicinity region of the upper slitting means and a cutting edge vicinity region of the lower slitting means overlap each other in a radial direction.

10. The method of polishing magnetic tape web slitting blades of claim 6, further comprising:

pushing the whetstone against outer circumferential surfaces of the upper or lower slitting blades so that the whetstone covers the cutting edges of the upper or lower slitting blades, wherein the whetstone covers the cutting edges of the upper or lower slitting blades so as to protrude into concavities of the cutting edges of the upper or lower slitting blades during polishing, wherein a plurality of the cutting edges are capable of being polished simultaneously.

* * * * *